Nov. 24, 1970 C. L. SPRING 3,541,691
METHOD FOR DETERMINING THE GREAT CIRCLE BEARING BETWEEN
TWO SELECTED GEOGRAPHIC POINTS
Filed Nov. 27, 1967

INVENTOR
CLAUDE L. SPRING
BY
Dick, Zarley, McKee & Thomte
ATTORNEYS

United States Patent Office 3,541,691
Patented Nov. 24, 1970

3,541,691
METHOD FOR DETERMINING THE GREAT CIRCLE BEARING BETWEEN TWO SELECTED GEOGRAPHIC POINTS
Claude L. Spring, 1803 61st St., Des Moines, Iowa 50222
Filed Nov. 27, 1967, Ser. No. 685,754
Int. Cl. G01c 21/20; G09b 27/08
U.S. Cl. 33—1            2 Claims

ABSTRACT OF THE DISCLOSURE

A method and means for determining the great circle bearing between two selected geographical points wherein a world inscribed globe is positioned so that its axis of rotation passes through a first selected geographical point on its surface, the spherical center of the globe and a reference means whereby the great circle bearing between the two points may be accurately determined. Means are also provided whereby the great circle bearing may be coordinated with other electronic directional equipment such as a rotatable antenna, laser beam, etc.

---

A radio operator must necessarily orient his antenna when attempting to establish communication with another radio operator who is located a great distance therefrom. The antenna orientation is necessary so that a sufficiently strong signal will be received. It is necessary that the antenna be oriented with respect to the great circle bearing between the two geographical locations when great distances are involved such as between the United States and Europe for example. The great circle bearing is usually determined by spherical trigonometry or by estimation. Obviously, the spherical trigonometry solution is time consuming and the guess work involved with the estimation solution makes that solution entirely unsatisfactory.

Therefore, it is a principal object of this invention to provide a method for determining the great circle bearing between two selected geographical points.

A further object of this invention is to provide a method for determining the great circle bearing between two selected geographical points which permits the direct reading of a great circle bearing in terms of a compass setting.

A further object of this invention is to provide a method for determining the great circle bearing between two geographical points and for coordinating other electronic equipment therewith.

A further object of this invention is to provide a means for determining the great circle bearing between two selected geographical points including a world inscribed globe, a reference means, and a dial coaxially affixed to the globe.

A further object of this invention is to describe a method wherein the compass bearing between two selective geographical points may be determined by causing the rotational axis of a world inscribed globe to pass through a base point on its inscribed surface.

A further object of this invention is to provide a method for the accurate and swift determination of great circle bearings between a base location and any other location in the world and the translation of that information to electronic equipment.

These and other objects will be apparent to those skilled in the art.

This invention consists in the method whereby the objects contemplated are attained as hereinafter more fully set forth, specifically pointed out in the claims, and illustrated in the accompanying drawings in which:

Figure 1:
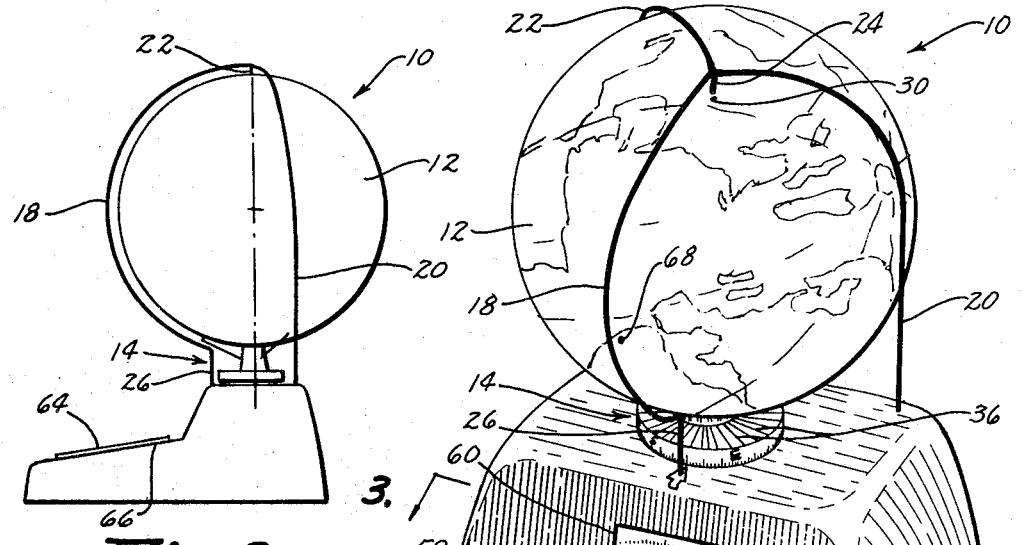
FIG. 1 is a front perspective view of the apparatus used for determining the great circle bearing between two selected geographical points.
Figure 2:
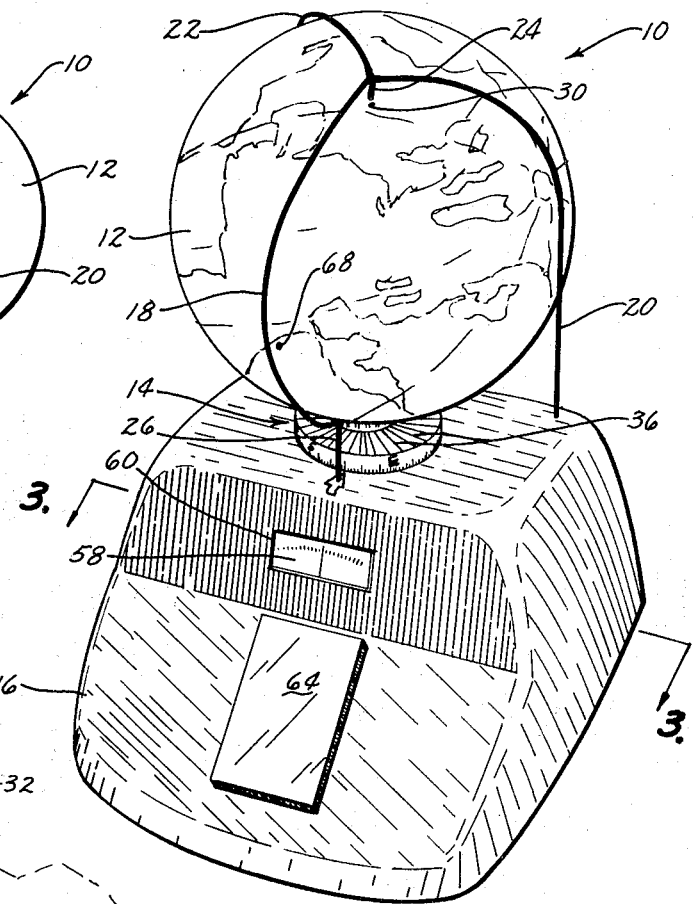
FIG. 2 is a side view of the apparatus of FIG. 1.

The apparatus which is used in this invention is generally designated by the reference numeral 10 which includes a world inscribed globe 12, rotational means 14 and base member 16. Globe 12 is accurately inscribed with the geographical features of the world and the globe has a great circle indicator 18 extending partially therearound as illustrated in FIGS. 1 and 2. A pair of supporting members 20 and 22 are secured to the upper end of great circle indicator 18 and extend outwardly and downwardly therefrom and are secured at their lower ends to the upper end of base member 16. A position indicator 24 extends downwardly from the junction of great circle indicator 18 and support members 20 and 22 as illustrated in FIGS. 1 and 2. The lower end of great circle indicator 18 is provided with a vertical portion 26 which extends downwardly therefrom to base member 16 as illustrated in FIGS. 1 and 2. The numeral 30 generally designates a first location on the globe and would correspond to the originating station or location.

Figure 3:
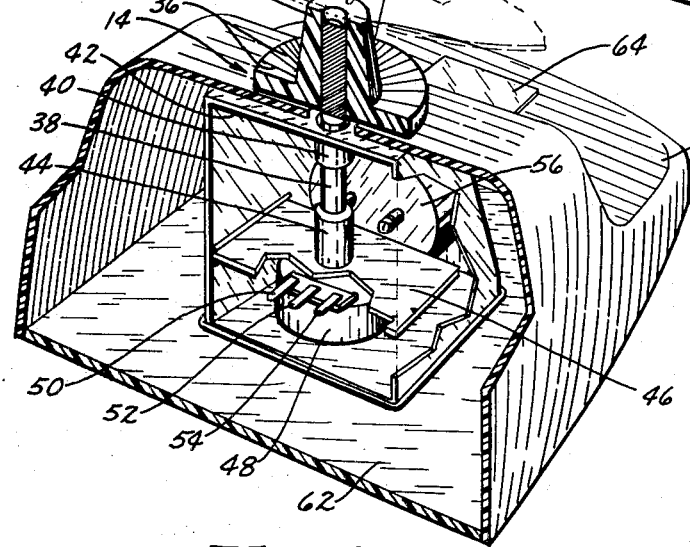
FIG. 3 is a fragmentary sectional view of the apparatus as seen along line 3—3 of FIG. 1.

The rotational means 14 includes a support 32 on which rests the globe and which is secured to the upper end of a post means 34 having compass markings 36 inscribed thereon as illustrated in FIGS. 1 and 3. A shaft 38 is secured to the post 34 and extends downwardly therefrom and is supported by a shaft bearing 40 which is secured to a housing 42. Shaft 38 has a locking collar 44 secured to its lower end which extends through a plate 46 and which is secured to an electrical component 48 such as a potentiometer or the like which is positioned below plate 46. Component 48 is provided with terminals 50, 52 and 54 if the component is a potentiometer. A meter 56 is also secured to housing 42 and the dial 58 thereon may be read through an opening 60 formed in base member 16 as illustrated in FIG. 1. As illustrated in FIG. 3, the housing 42 and the components therein are detachably secured to bottom 62 of base member 16 and are positioned within the interior of the base member 16. A mirror 64 is provided on the inclined forward portion 66 of the base member 16 and permits the convenient viewing of the bottom portion of the sphere and its geographical data with respect to the great circle indicator 18.

Figure 4:
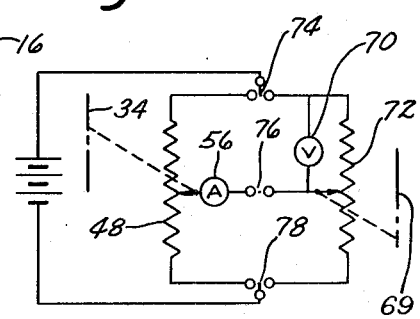
FIG. 4 is a schematic illustration of the circuitry which may be used with the apparatus of FIG. 1 to coordinate the same with other electronic equipment.

The great circle bearing between the originating point 30 and a second location generally designated by the reference numeral 68 is determined by first manually rotating post 34 so that the north marking thereon is in line with the vertical portion 26 of great circle indicator 18. The globe is then manually positioned with respect to the post 34 so that the point 30 is directly below the position indicator 24 and so that the North Pole inscribed on the globe also falls under the indicator 18. Thus, when it is desired to determine the great circle bearing from the station 30 to a station or location 68, the globe, support means 32 and post 34 are rotated until the station 68 is positioned below the indicator 18. The great circle bearing from station 30 to station 68, with respect to a North lying base, is then determined by reading the compass marking 36 which is aligned with the vertical portion 26. The operator could then manually orient his antenna to the proper compass bearing so that the antenna would be pointed toward the great circle bearing between the originating point 30 and the second point 68. If the antenna is to be manually operated, the electrical components within the base member 16 are not needed but have been included to illustrate the manner in which the great circle bearing can be coordinated electronically with other electronic equipment. The coordination is possible due to the fact that the potentiometer 48 is controlled by the rotation of the shaft 38 which in turn is controlled by the rotation of the globe. Rotation of the post 34 causes shaft 38 to be rotated which causes a relative change in the electrical characteristics of the potentiometer 48. FIG. 4 is a schematic illustration of a Wheatstone bridge circuit and illustrates the means for coordinating the apparatus illustrated in FIG. 1 to an existing electronic network. For example, the position of an electrically rotated antenna 69 is indicated by a volt meter 70 whose graduations are in terms of compass markings and wherein the voltage is read across a variable resistor or potentiometer 72 having its movable element adjusted with the rotation of the antenna. Thus the connection of the terminals 74, 76 and 78 of the potentiometer 72 to those of the potentiometer 48 cause the resistor or potentiometer 72 to become one-half of a Wheatstone bridge circuit with the other half thereof being the potentiometer 48. Thus, changes in one-half of the circuit are reflected by the meter 56 and the adjustment of either the electronic apparatus and/or rotation of the globe by the rotational means 14 will indicate a null reading on the meter 56 when the apparatus 10 and the electronic apparatus are in synchronization. It is thus possible to set the electronic apparatus to a great circle bearing indicator on the apparatus 10, or to establish the great circle bearing to which the electronic apparatus is set. The electronic apparatus could be comprised of an antenna, laser beam, or any positioning servo-mechanism.

Thus it can be seen that a method has been provided which permits the determination of a great circle bearing between two selected geographical locations. While the apparatus illustrated in the drawings is the preferred apparatus, it should be noted that the method of determining the great circle bearing between two geographical locations is the prime consideration in this invention. It can be appreciated that compass bearings between two locations are determined by causing the axis of the globe rotation to pass through the predetermined base point on the inscribed surface. Thus it can be seen that the method accomplishes at least all of its stated objectives.

Some changes may be made in the construction and arrangement of my Method and Means for Determining the Great Circle Bearing Between Two Selected Geographical Points without departing from the real spirit and purpose of my invention.

I claim:
1. The method of determining the great circle bearing between first and second geographical locations by employing apparatus comprising a stationary base member on which is supported, for rotation about a common vertical axis, a globe rest carrying an azimuth scale and a geographically inscribed globe centered on the axis:
   rotating the rotatable rest to align its zero mark with a great circle indicator fixed relative to said base member and marking a great circle through the said vertical axis,
   positioning said globe on said globe rest so that said vertical axis intersects said first geographical location on said globe,
   rotating said globe with respect to said globe rest about said vertical axis, until the North Pole inscribed on the globe is aligned with said great circle indicator,
   rotating said globe and said globe rest relative to said base member until the second geographical location is aligned with said great circle indicator,
   reading the azimuth on the said azimuth scale which is aligned with said great circle indicator.

2. The method of claim 1 wherein a powered rotatable antenna is provided at said first geographical location and wherein a control means electrically connects said globe rest and the power means rotating said antenna so that movement of said globe rest to the said position wherein the said second geographical location is aligned with said great circle indicator will cause the coordinated rotation of said antenna so that the direction of said antenna will correspond to said azimuth.

References Cited

UNITED STATES PATENTS

| 2,060,777 | 11/1936 | Haardt. | |
| 2,151,601 | 3/1939 | Johnson. | |
| 2,405,418 | 8/1946 | Fukal | 35—46 |
| 2,429,754 | 10/1947 | Hagner | 33—61 |
| 2,520,922 | 9/1950 | Framme et al. | |
| 2,546,764 | 3/1951 | McHose. | |
| 2,896,338 | 7/1959 | Petersen | 35—46 |

FOREIGN PATENTS 1,004,206 11/1951 France.

ROBERT B. HULL, Primary Examiner

U.S. Cl. X.R.

35—46